Jan. 19, 1937.  R. W. BABSON  2,068,121
COMBINED PARKING METER AND ADVERTISING DEVICE
Filed May 22, 1930
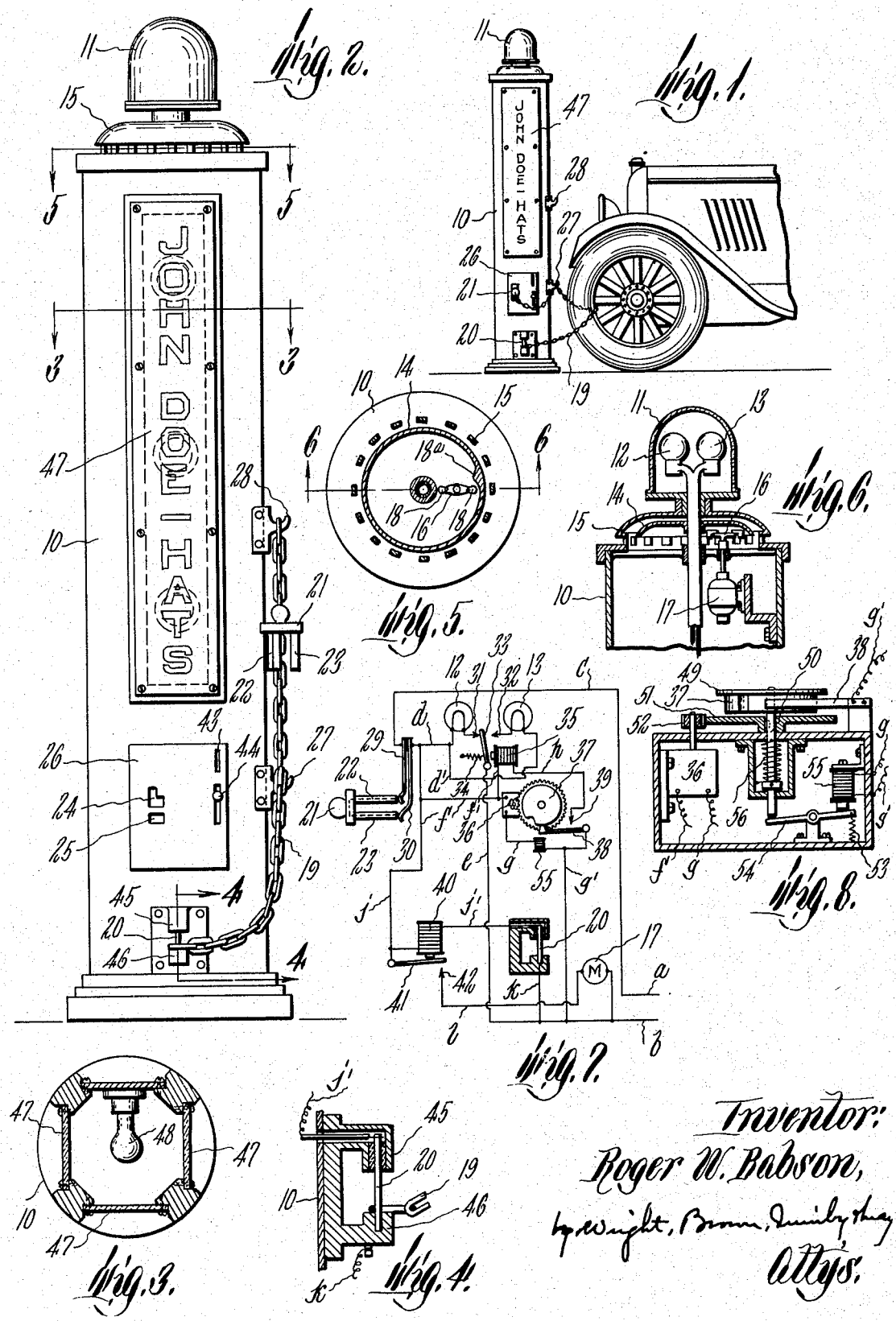
Inventor:
Roger W. Babson,
by Wright, Brown, Quinby & May
Attys.

Patented Jan. 19, 1937

2,068,121

UNITED STATES PATENT OFFICE 2,068,121

COMBINED PARKING METER AND ADVERTISING DEVICE

Roger W. Babson, Wellesley, Mass.

Application May 22, 1930, Serial No. 454,670

11 Claims. (Cl. 177—311)

The present invention relates to apparatus for use in connection with parked automobiles, etc. to measure and indicate the lapse of time during which the automobile has remained in a parking space. It is of the same generic character as the apparatus disclosed in my patent granted October 15, 1929, No. 1,731,839, and my application, Serial No. 420,270, filed January 11, 1930, now Patent No. 1,965,066, granted July 3, 1934, but includes new objects and characteristics. One of the new objects is to provide attaching means which is entirely a part of the fixed apparatus, and not a part of the equipment of the automobile or its operator, for making a connection between the stationary apparatus and the automobile and for putting into action the measuring and indicating parts of the apparatus. Another is to provide means associated with the connector for sounding an alarm, or making an equivalent distinctive character of signal, if the automobile is removed from the parking place without previous disconnection of the connector in the approved manner. Another object is to combine an advertising medium with such a parking indicator. These and allied objects are accomplished by the embodiment of the invention hereinafter described and illustrated in the drawing.

The invention consists in such embodiment and in all substantial equivalents thereof and the principles embodied therein.

In the drawing,—

Fig. 1 is an elevation showing a parking indicator containing this invention and the forepart of an automobile adjacent to and connected with it;

Fig. 2 is an elevation on a larger scale of the parking indicator in its idle condition;

Figs. 3, 4 and 5 are detail sections of the apparatus taken on lines 3—3, 4—4 and 5—5, respectively, of Fig. 2;

Fig. 6 is a vertical section of the upper end of the apparatus taken on line 6—6 of Fig. 5;

Fig. 7 is a diagram of the electrical connections and electrically operated equipment of the apparatus;

Fig. 8 is a detail sectional view of the timing means of the apparatus.

Like reference characters designate the same parts wherever they occur in all the figures.

One purpose which I have had prominently in view is to afford a measure of the time during which an automobile has remained parked at the side of a public street, and for that purpose I have designed the herein illustrated embodiment of the invention as a post or column adapted to be erected at the border of the street, as on or just within the curb of a sidewalk, where parking is permitted by the authorities. Such column may be any desired construction and design, and is here shown as a box column in the interior of which the electrical controlling equipment is located and on the top of which the signal devices are mounted. I will now describe this embodiment, with the understanding that it is illustrative and not a specific limitation of the invention, either as to the details of its construction and equipment or its place of use.

The column 10 supports on its upper end a translucent globe 11, preferably of frosted glass, in the interior of which are two signal lights 12 and 13 (Fig. 6) having different color characteristics. For the purpose of this description it may be assumed that these are incandescent electric lights, of which the one designated 12 has a green glass bulb and that designated 13 a red one. A gong 14 to serve as an alarm signal is mounted at the top of the column beneath a cover 15 which is arranged to protect the gong from rain and snow and beneath which are openings to allow emission of sound waves. A striker for the gong is shown in Figs. 5 and 6 as a two-armed carrier 16 mounted on the armature shaft of electric motor 17 and carrying centrifugal weights 18 on the ends of its arms adapted to strike a projection 18a on the inside of the rim of the gong when rapidly revolved. This is a well known type of striker commonly used in bicycle signal bells, which may be driven otherwise, as by a spring motor under control of an electrically operated detent, or may be replaced by other suitable striking means.

A chain 19, or equivalent tie member, is made fast at one end to the column by a coupling 20, and carries attached to its other end a plug 21 adapted to be detachably inserted into an opening in the column end, when so inserted, to complete certain electric circuits. As here shown, the plug is like that illustrated in my patent above named and has two prongs 22 and 23 which are insertable in openings 24 and 25, respectively, in the wall of the column 10, or of a box 26 placed and secured in the column and containing the after described electrical equipment, and coin controlled locking means when such is used. The chain is long enough to be passed around some part of an automobile parked adjacent to the column, as, for instance, the rim of a wheel, a bumper, an axle, etc., as illustrated in Fig. 1. A hook 27, or equivalent holder, is mounted on the column for engagement with the chain when thus passed around a part of the automobile, as shown in Fig. 1. Another hook 28 is provided at a higher level to hold the chain clear of the ground, as illustrated in Fig. 2, when it is not so engaged with the automobile. The hook 27 relieves the plug from any strain when the chain is engaged with the automobile and the plug inserted in the openings provided for it, as shown in Fig. 1, although it is not essential if the plug is locked in place after insertion.

Attention is now called to the diagram of electrical equipment shown in Fig. 7. a and b represent the leads for current from any suitable source, such as the local electric lighting system. One lead is connected by conductor c with one of two electrically and mechanically separated contact members 29 and 30 adapted to be engaged and coupled electrically by the prongs 22 and 23 of plug 21; said prongs being electrically connected with one another or carrying a continuous conductor adapted to engage the contact members 29 and 30. Or the plug may be otherwise made and adapted to move one of the contacts 29 or 30 into direct conducting contact with the other. From the contact member 30 extends a conductor d to the green signal light 12 and a branch conductor d' to the red signal light 13. The opposite terminals of these lights are connected to switch contacts 31 and 32 between which is a switch lever 33 normally held by a spring 34 in engagement with contact 31, but adapted to be shifted by an electro magnet 35 over to contact 32. Switch arm 33 is the armature of the electro magnet and is coupled by a conductor e with the return lead of the circuit.

A conductor f connects the switch contact 30 with a self starting synchronously running electric motor 36 from which a return conductor g, g' goes to the return lead of the circuit. This motor drives through suitable gearing a cam 37 at any desired rate of speed, for instance, through one rotation in twelve hours. The cam controls a spring biased switch arm 38, holding the latter away from its complemental contact 39 until after the cam has been moved a certain distance from starting position, and then allowing it to close against contact 39 and complete the circuit through electro magnet 35 by means of conductors f, f', h and g'.

A further circuit from the switch contact 30 comprises conductor j, coupling 20 and conductor k, and includes an electro magnet 40, the armature 41 of which constitutes a switch arm coupled to the conductor j and cooperating with a contact 42 coupled by conductor l with the motor 17 previously described as operating the striker of gong 14.

A driver in order to park his car legally must place it so near the post located beside the selected parking place that the chain may be passed around a wheel rim, bumper, or axle, etc., as described, and must so pass the chain and insert the plug in the opening provided therefor. Such insertion immediately closes the circuit of the green light and of the time motor 36, causing the former to glow and the latter to commence running. At the end of the period during which parking free of special restrictions or penalties is permitted, which may be an hour or other designated time and with respect to which the timing cam is constructed and geared, such cam causes the switch 38—39 to be closed and the magnet 35 energized. The latter then shifts its armature, the switch lever 33, from contact 31 to contact 32, extinguishing the green light and causing the red light to glow. This notifies the authorities that the car has been parked beyond the prescribed limit and enables appropriate measures to be taken.

If the motorist fails to insert the plug as required, the failure of either light to be illuminated will equally show that the car is illegally parked.

It is part of my intention to lock the plug in its inserted position, either immediately upon insertion, or (and preferably) at the end of the time limit when the light indication changes; and to provide either a coin-controlled lock release or other means releasable only by an authorized officer or attendant. Coin-controlled locking means suitable for this purpose are shown in my prior Patent No. 1,731,839, and key controlled locking means operated by the timing mechanism in my pending application hereinbefore identified, and are not repeated here except that a coin slot 43 and a coin-controlled lock releasing handle 44 are shown in Fig. 2. Reference is directed to said prior patent and said application for explanation of the details of suitable locking means. These references are sufficient for the purposes of this description to make it understood that the plug may be locked so that the motorist cannot withdraw it after expiration of the permitted parking time without either depositing a coin or notifying and obtaining the assistance of an officer.

The alarm gong 14 is provided to prevent a motorist from driving away without satisfying the requirements of the situation. For that purpose the coupling 20 is included in the circuit of the electro magnet 40 and is made weaker than the chain or the connection of the chain with the plug or the lock by which the plug is held. Suitably this coupling is a pin, rod or wire or the like, secured at its ends in holders 45 and 46 and extending across the gap between said holders where it is engaged with the end link of the chain. One of the holders, or the bracket supporting both holders, is of metal and is connected with the conductor k, while the other holder, or a liner therein which receives the other end of the coupling is connected with a wire j' in the circuit j, such wire being otherwise insulated from the holder. If the coupling is pulled out or broken by the car in departing from the parking place, the magnet 40 is deenergized, and allows the switch 41, 42 to close the circuit of the striker motor, which rings the gong. It is readily feasible to make the coupling thus weaker than the chain, while at the same time having strength enough to secure the chain when used properly, by making it either of weaker metal or of smaller thickness.

I intend to use the column as an advertising medium, and have shown it herein as provided with panels 47 on which advertising matter appears. Such panels may be transparent or translucent in part, either in the areas which form the advertising letters or symbols, or those areas which form the background for such symbols, for illumination at night by lights 48 inside of the column.

The timing means may be embodied in devices of various characters adapted to serve the functions described. After disconnection of the car from the metering apparatus, the timing member should be set back to starting position. I have devised means for doing this automatically, a simple form of which is shown in Fig. 8. Here the timing member is shown as a disk 49 to which the cam 37 is connected as an apron, and with which is connected a shaft 50 keyed to a gear 51 in mesh with a pinion 52 on the driven shaft of the motor 36. Shaft 50 is movable endwise to bring the gear into and out of mesh with pinion 52, and is adapted to be raised into the non-meshing position by a spring 53 acting through a lever 54 arranged substantially as shown. One arm of this lever is the armature of an electro magnet 55 arranged in the circuit g, g', whereby when the connector plug is inserted this magnet causes the shaft and gear 51 to drop into mesh. A spring 56 surrounds shaft 50 and is connected thereto and to the housing so that it is put under increasing tension as the timing disk advances. Thus when the disk is unmeshed from the motor by spring 53 when the control plug is withdrawn from the post, the spring automatically returns the disk to zero or starting position. Suitable stops of a kind well understood and therefore not necessary to be shown here, may be provided, if necessary, to prevent the disk from being carried by the spring beyond zero position.

It will be apparent to those skilled in the art that numerous modifications from the specific embodiment here described, and substitutions of equivalents for the parts thereof, may be made without departing from the invention and protection claimed. For example, the signal lights and gong may be otherwise placed, and other signaling means than lights and a gong may be used for the purposes of these parts. More particularly, other types of connecting means than a chain may be used for the purposes of the chain here described, as a wire cable or the like, sufficiently flexible to be used in the manner indicated, and offering substantial difficulty to being cut. The coupling 20 may be otherwise than as described, for instance a plug held in place by relatively light friction and arranged to close a gap in the circuit of magnet 40 when properly in place.

It is possible, however, and is a part of my contemplation and present invention, to use the plug in permanent connection with the indicator apparatus by means of a chain or the like and without the provision for breaking the connection at a specified point and ringing the alarm. This aspect of the invention differs from the basic idea of my before mentioned pending application by the provision of a normally permanent flexible tie between the plug and the indicator apparatus and the capability of using this tie to attach the parked automobile to the indicator. In this case the connector is a normally permanent part of the indicator apparatus instead of being in the possession of the car operator or a part of the equipment of the car.

I am aware that means have been heretofore proposed for prevention of theft of bicycles, consisting of a chain attached at one end to a fixed wall or rack and adapted to be passed around a wheel rim of the bicycle and secured at the opposite end by a key operated lock. But the present invention departs from such proposals in numerous respects; including the signal means by which lapse of time is indicated for a purpose wholly foreign to that of the said proposals, the fact that the chain is engaged with a hook so that the plug is relieved of strain when inserted, the alarm device which is operated when the chain is torn loose from its normally permanent fastening, the advertising feature, etc.

Instead of the plug lock releasable by a coin controlled mechanism or otherwise, previously described, or in conjunction with it, I may provide a coin controlled means for delaying the flashing on of the red signal light. That is, in some circumstances it may be permissible and desirable to permit an extended parking time in consideration of a payment by the car owner, and without causing the signal to indicate an over stay. To this end I have devised a means by which deposit of a coin before the end of the normal parking limit causes the shifting of the signal light from green to red to be delayed. Such means is disclosed and claimed in another application filed by me July 8, 1930, Serial No. 466,421, entitled Automatic parking meter, now Patent No. 1,973,275, granted September 11, 1934, and is therefore not illustrated here. But I reserve the right to use such means, and protect its use, in connection with the parking meter described in this specification.

What I claim and desire to secure by Letters Patent is:

1. A parking indicator comprising a support having connector-locking means, an electrically operated signal on the support, electrical means for operating said signal including a normally open electric circuit and a connector for insertion into the support adapted to be locked thereto and adapted when so inserted to close said circuit, a tie member connected to the connector, a normally permanent electrically conductive coupling between the holder and a part of said tie member, an electro magnet in circuit with said coupling and the before named circuit closer, whereby it is energized when the circuit is completed at said circuit closer and is deenergized if said coupling is broken, an alarm signal, an electrically controlled actuator for the alarm signal, and a switch in circuit with said actuator controlled by said magnet to break the last named circuit when the magnet is active and complete the circuit when the magnet is deenergized.

2. In a parking indicator, a plurality of different electrical signals and a signal changing device, a connector adapted to be applied to said device, a connector adapted to be applied to said indicator in cooperation with an automobile parked beside the indicator, circuit closing means arranged to cooperate with said connector to close the after-mentioned circuits when the connector is so applied, electrical circuits between said circuit closer, signals, signal changing device and a source of electric current, an electric motor in circuit with said circuit closing means adapted to be put into operation when the connector is so applied, means driven by said motor for actuating said signal changing device after lapse of a predetermined time so as to discontinue a hitherto operative signal and put into action a hitherto inoperative signal, and automatic means for returning the signal changing device to its original position upon disconnection of said connector.

3. The combination with a stationary supporting structure having connector-locking means and a connector adapted to be engaged detachably with said structure and locked by said locking means, of a tie member coupled at one end to said connector and at its opposite end to said supporting structure and being adapted to be passed around a part of an adjacently parked automobile, together with a signal and means for actuating said signal when the connector is so engaged and locked, and the coupling between said tie member and supporting structure is broken.

4. The combination with a parking indicator comprising a stationary holder having connector-locking means and a connector separably attachable to said holder in locked engagement with said locking means, of a tie member to which said connector is attached, a normally permanent coupling between said tie member and the holder, weaker than the tie member and adapted to be broken by abnormal strain through said member, said coupling being part of an electric circuit, an alarm signal, a normally inoperative actuator for said alarm signal in circuit with said coupling, and means for causing said actuator to become operative when the connector is attached to the holder and the circuit is broken by breakage of the coupling.

5. In a parking apparatus and in combination with a supporting structure, a detachable connector, and means for locking said connector to the supporting structure, a relatively unbreakable tie member made fast at one end to said connector and adapted to be passed around a part of an adjacently parked automobile, a relatively frangible coupling securing the other end of said tie member to the supporting structure and adapted to be broken by abnormal pull on the tie member, an electric circuit in which said frangible coupling is a part, means for closing said circuit by application of the connector to the supporting structure, an electro magnet in said circuit, an alarm signal, an electrically controlled actuator for said signal, and a switch in the circuit of said actuator controlled by said magnet to break the last named circuit when the magnet is active and to complete the circuit when the magnet is made inactive by breakage of the coupling.

6. In a parking indicator of the character described, a plurality of electric signals, an electric motor, a detachable connector, means whereby said connector operates one of said signals and puts said motor into action, means driven by the motor for subsequently discontinuing the last named signal and putting the other signal into operation, and means for disconnecting said motor driven means from the motor, and returning it to starting position, when the connector is disconnected.

7. In a parking indicator of the character described, a plurality of electric signals, a shiftable switch and circuits in which said signals and switch are connected with provisions for operating one or another of the signals exclusively according to the position in which the switch is placed, an electro-magnetic shifter for said switch, a connector, and means operable thereby for closing a break in such circuits, an electric motor, means whereby said connector starts said motor, timing means in driven connection with the motor, and means controlled by said timing means for putting said electromagnetic shifter into operation to shift the switch from circuit closing position with respect to one signal into circuit closing position with respect to a different signal.

8. In a parking indicator of the character described, a plurality of electric signals, a shiftable switch and circuits in which said signals and switch are connected with provisions for operating one or another of the signals exclusively according to the position in which the switch is placed, a connector, and means operable thereby for closing a break in such circuits, an electric motor, means whereby said connector starts said motor, timing means in driven connection with the motor, means controlled by said timing means for shifting the switch from circuit closing position with respect to one signal into circuit closing position with respect to a different signal, a spring connected to said timing means arranged to be put under increased stress by the motor driven movement of the timing means, and automatic means operated by removal of said connector for releasing the timing means from the motor, whereby said spring becomes operative to return the timing means to starting position.

9. A parking indicator comprising a rigid structure located contiguous to a berth in which an automobile may be parked, a flexible tie member connected at one point to said structure with a normally inseparable connection and adapted to be passed around a part of the contiguous parked automobile and to be connected at a second point to said structure, the means for connecting said tie member at the second point including a connector insertable into the structure, combined with changeable signals and a timing means, means by which the insertion of said connector actuates one of said signals and starts the timing means, and means by which the said timing means causes the signal to be changed after lapse of a predetermined time.

10. The combination with a stationary supporting structure having connector locking means, and a connector adapted to be engaged detachably with said structure and locked by said locking means, of a tie member adapted to be passed around a part of an automobile and having connection with said supporting structure and said connector respectively at separated points, the connection between the tie member and supporting structure being relatively frangible so as to be broken by a pull exerted through the tie member, a signal, and means under the joint control of said frangible connection and the before mentioned connector, for putting said signal into operation when the frangible connection is broken and the connector remains in engagement with the supporting structure.

11. The combination with a parking indicator comprising a stationary holder having connector locking means and a connector separably attachable to said holder in locked engagement with said locking means, of a tie member to which said connector is attached, a normally permanent coupling between said tie member and the holder, weaker than either the tie member or the connection of the tie member with said connector or the locked attachment of the connector to the holder, whereby the coupling is frangible by abnormal strain applied through the tie member, a signal device, a normally open electric circuit including a shiftable circuit closer for controlling the signal, said circuit being closed by attachment of the connector to the holder, and means for shifting said circuit closer into open circuit position when the connector is so attached and the coupling is intact, and for causing the circuit closer to complete the circuit when the coupling is broken.

ROGER W. BABSON.